(12) United States Patent
Wang (10) Patent No.: US 8,738,833 B2
(45) Date of Patent: May 27, 2014

(54) COLLABORATIVE BUS ARBITRATION MULTIPLEX ARCHITECTURE AND METHOD OF ARBITRATION OF DATA ACCESS BASED ON THE ARCHITECTURE

(75) Inventor: Sung-Jung Wang, New Taipei (TW)

(73) Assignee: An Chen Computer Co., Ltd., New Taipei (TW)

( * ) Notice: Subject to any disclaimer, the term of this patent is extended or adjusted under 35 U.S.C. 154(b) by 82 days.

(21) Appl. No.: 13/474,426

(22) Filed: May 17, 2012

(65) Prior Publication Data
US 2013/0254449 A1 Sep. 26, 2013

(30) Foreign Application Priority Data

Mar. 20, 2012 (TW) .............................. 101109532 A (51) Int. Cl.
*G06F 13/28* (2006.01)
(52) U.S. Cl.
CPC ...................................... *G06F 13/28* (2013.01)
USPC .............. 710/308; 710/22; 710/310; 710/311
(58) Field of Classification Search
CPC ....................................................... G06F 13/28
USPC ........... 710/113, 314, 316, 240–244, 22, 308, 710/310–311
See application file for complete search history.

(56) References Cited

U.S. PATENT DOCUMENTS

| | | | | |
|---|---|---|---|---|
| 5,706,469 A * | 1/1998 | Kobayashi | ..................... | 710/240 |
| 6,286,070 B1 * | 9/2001 | Ohara | ............................ | 710/113 |
| 7,287,101 B2 * | 10/2007 | Futral et al. | ..................... | 710/22 |
| 7,315,909 B2 * | 1/2008 | Lehongre | ...................... | 710/105 |
| 7,640,374 B2 * | 12/2009 | Tomozaki et al. | .............. | 710/22 |
| 7,827,331 B2 * | 11/2010 | Baba et al. | ....................... | 710/72 |
| 7,849,277 B2 * | 12/2010 | Matsutani | ..................... | 711/158 |
| 7,853,733 B2 * | 12/2010 | Nakagoe et al. | ................ | 710/22 |
| 8,122,177 B1 * | 2/2012 | Puranik | ......................... | 710/308 |
| 8,230,137 B2 * | 7/2012 | Araki | .............................. | 710/28 |
| 8,266,340 B2 * | 9/2012 | Nagai et al. | ..................... | 710/22 |
| 8,589,601 B2 * | 11/2013 | Hiramoto et al. | .............. | 710/23 |
| 2006/0161694 A1 * | 7/2006 | Tomozaki et al. | ............. | 710/22 |
| 2007/0208886 A1 * | 9/2007 | Minami | ......................... | 710/22 |
| 2008/0209085 A1 * | 8/2008 | Fukawa | ......................... | 710/22 |
| 2010/0312924 A1 * | 12/2010 | Araki | ............................. | 710/22 |
| 2012/0331186 A1 * | 12/2012 | Nagai et al. | .................... | 710/22 |

* cited by examiner

*Primary Examiner* — Ryan Stiglic
(74) *Attorney, Agent, or Firm* — Muncy, Geissler, Olds & Lowe, P.C.

(57) ABSTRACT

A collaborative bus arbitration multiplex architecture includes of a main memory, a bus, a plurality of BMPDs, and a BAM. Arbitration can be done according to the following steps of awaiting whether any of the BMPDs renders any request for access; B) identifying whether the access authority of the bus is being fetched by any other BMPDs; C) identifying whether the main memory to which the request for access corresponds have any record that the corresponding BMPD needs special treatment; D) identifying whether all of the BMPDs have rendered the requests for access; E) according to a generic arbitration principle, identifying whether the corresponding BMPDs indicated in the steps C) and D) win the access authority; F) yielding the access authority of the bus to the BMPDs winning the access authority as indicated in the step E); and G) accessing the main memory.

7 Claims, 9 Drawing Sheets

COLLABORATIVE BUS ARBITRATION MULTIPLEX ARCHITECTURE AND METHOD OF ARBITRATION OF DATA ACCESS BASED ON THE ARCHITECTURE

BACKGROUND OF THE INVENTION

1. Field of the Invention

The present invention relates generally to data access of computer bus, and more particularly, to a collaborative bus arbitration multiplex architecture and a method arbitration of data access based on the architecture.

2. Description of the Related Art

Figure 7:
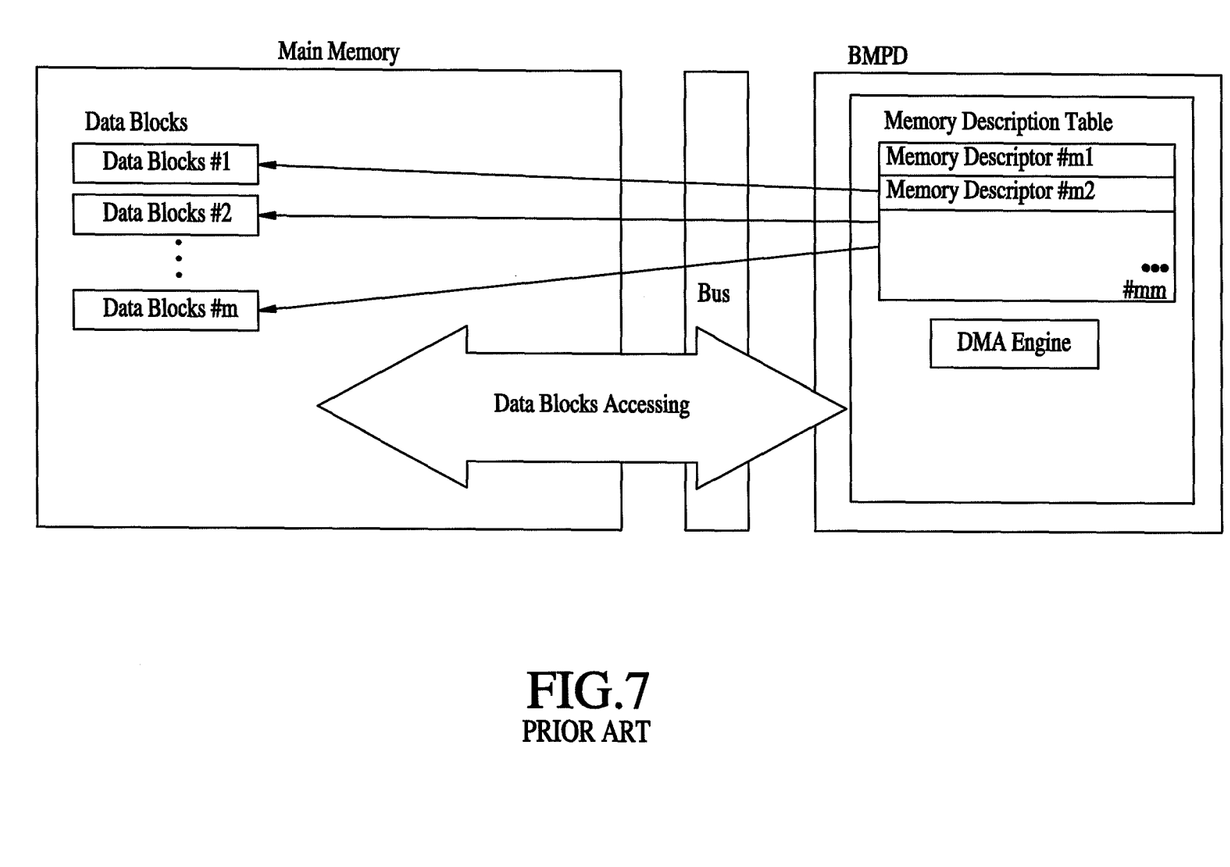
FIG. 7 is a block diagram of one conventional BMPD accessing the main memory.

Referring to FIG. 7, a conventional computer includes a bus master peripheral device (BMPD) having the function of bus master for access to the data block of the main memory via direct memory access (DMA) engine and memory description table (MDT).

In the aforesaid architecture, the DMA engine can actively access the data block of the main memory via the bus subject to the MDT. The MDT includes at least one memory descriptor, each of which records the size, location, and other additional information of the data block.

Figure 8:
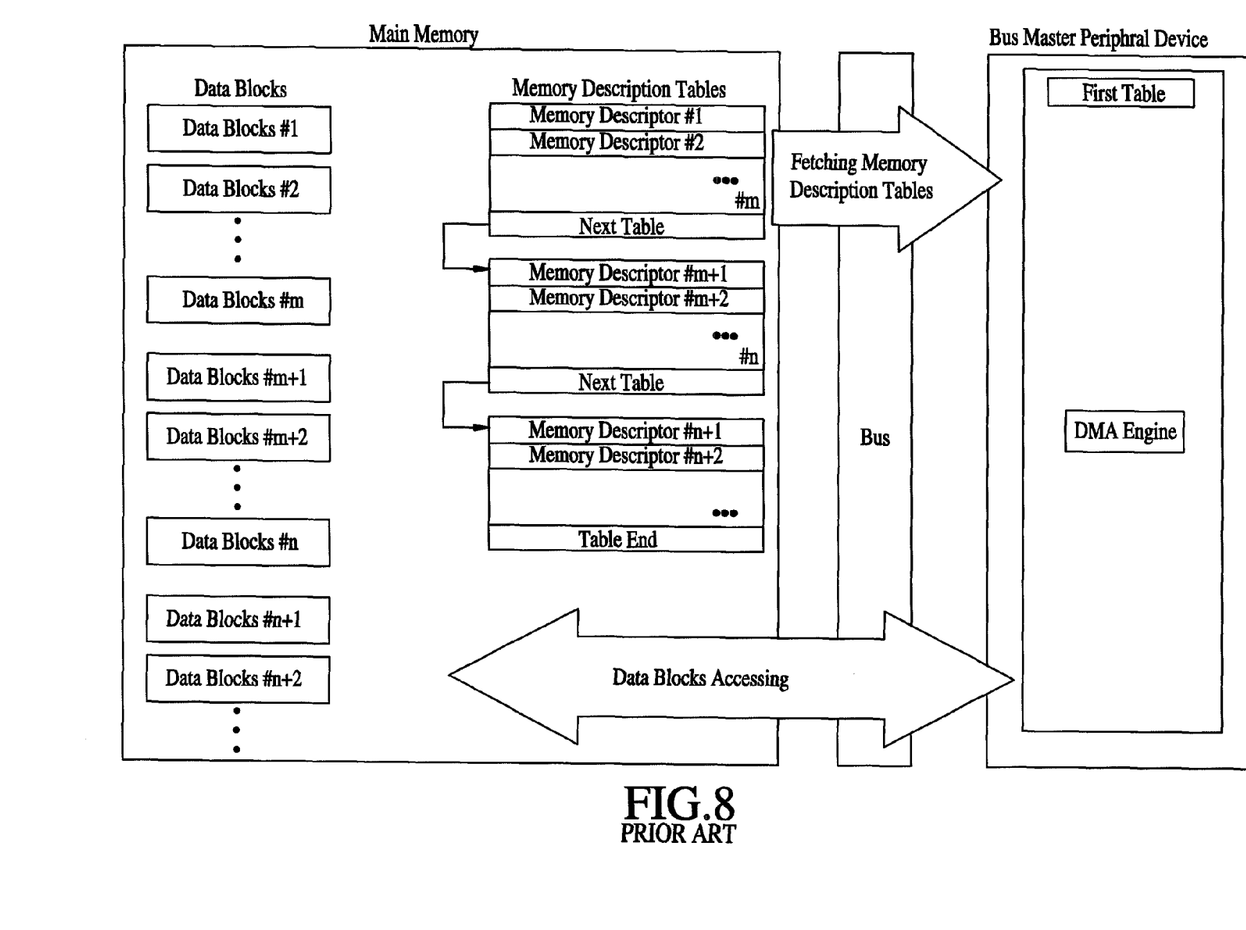
FIG. 8 is a block diagram of another conventional BMPD accessing the main memory.

Referring to FIG. 8, alternatively, the MDT can be put into the main memory. In the meantime, in the DMA engine, the MDT can be fetched via the pointer of first table indicative of the location of the MDT. In such architecture, the general main memory includes a paging structure, so the MDT can be one and more, which are connected with each other via a link list (not shown). The DMA engine can fetch the MDTs one by one to access the corresponding data blocks.

Figure 9:
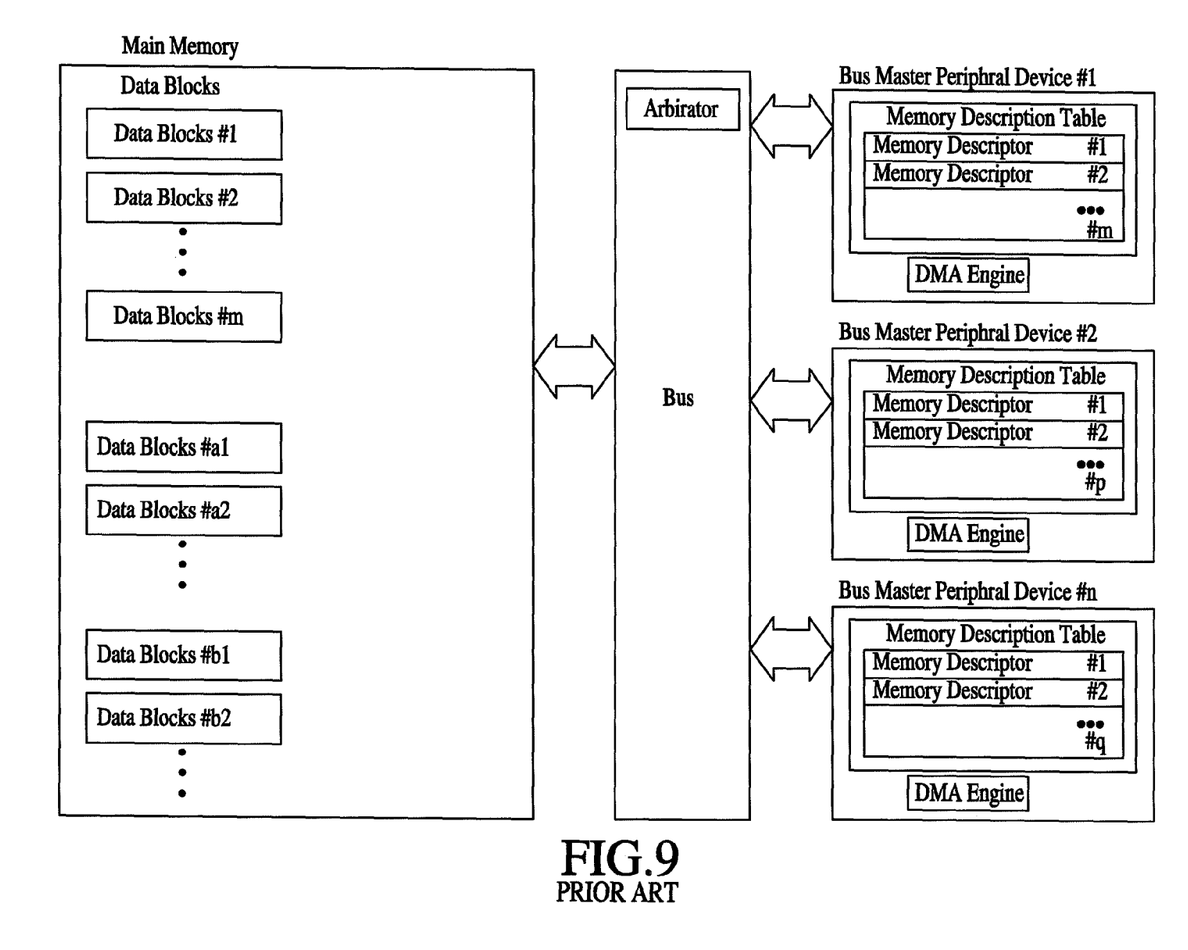
FIG. 9 is a block diagram of another conventional BMPD accessing the main memory.

Referring to FIG. 9, the general computer system includes at least one BMPD and the bus includes an arbitrator functioning as arbitration. Only one BMPD can have access to the bus within each unit time.

An example of the BMPD having the MDT is taken for illustration hereinafter. Under the normal circumstances, the BMPD can fetch access authority from the arbitrator of the bus according to the MDT thereof to further access the corresponding data block. In FIG. 9, the data block is represented by #m; even if the same data block is accessed, it is still permissible. It indicates that the data is read multiply when the reading action proceeds. When the write-in action proceeds, second write can overwrite first write, so such design is meaningless in practical application.

In each of aforesaid three prior techniques, there is none of any management protocol for multiple BMPDs to access the same data block, so whichever BMPD fetches control authority, its treatment will proceed firstly. However, bandwidth of the main memory will be mostly wasted and the other BMPDs will idle to further waste time.

SUMMARY OF THE INVENTION

The primary objective of the present invention is to provide a collaborative bus arbitration multiplex architecture, which can manage the sequence of control authorities of the BMPDs via an arbitration protocol to enable all of the BMPDs having access to the same data block to collaborate so as to save the bandwidth.

The secondary objective of the present invention is to provide a collaborative bus arbitration multiplex architecture, which can carry out comparison and data computation while arbitration proceeds.

The foregoing objectives of the present invention are attained by the collaborative bus arbitration multiplex architecture composed of a main memory, a bus, a plurality of BMPDs, and a bus arbitration & multi-selection multiplexor (BAM). The main memory includes a plurality of data blocks. The bus is electrically connected with the main memory. Each of the BMPDs includes an MDT and a DMA engine. Each of the MDTs has at least one memory descriptor. The BAM is electrically connected with the BMPD and the bus and includes an arbitrator, a multi-selection multiplexor, an extended MDT (EMDT), and a DMA engine. The EMDT has at least one memory descriptor. The arbitrator has a generic arbitration protocol.

A method of arbitration of data access based on the aforesaid the collaborative bus arbitration multiplex architecture includes the following steps of A) awaiting whether any of the BMPDs renders any request for access; if yes, proceed to the step B); B) identifying whether the access authority of the bus is being fetched by any other BMPDs; if yes, reserve the request for access indicated in the step A) and return to the step A); if not, proceed to the step C); C) identifying whether the data block and the EMDT to which the request for access corresponds have any record that the BMPD rendering the request for access needs special treatment; if yes, proceed to the step D); if not, proceed to the step E); D) executing the special treatment by identifying whether all of the BMPDs rendering the same requests for access as recorded in the EMDT have rendered the requests for access; if yes, deem the BMPDs rendering such requests for access as the same group and then proceed to the step E); if not, in the EMDT note that the BMPDs have rendered the requests for access and then return to the step B); E) according to a generic arbitration principle, identifying whether the BMPDs in no need of the special treatment as indicated in the step C) win the access authority or identifying whether the requests for access of the BMPDs in the same group as indicated in the step D) win the access authority; if either is yes, proceed to the step F); if both are noes, reserve the request for access of the single BMPD or those of the BMPDs in the same group and return to the step A); F) yielding the access authority of the bus to the single BMPD or the BMPDs winning the access authority as indicated in the step E); and G) accessing the main memory.

In addition, the aforesaid the collaborative bus arbitration multiplex architecture can further include a multi-selection comparator and a multi-selection calculator for comparison and data computation while the arbitration proceeds.

DETAILED DESCRIPTION OF PREFERRED EMBODIMENTS

Figure 1:
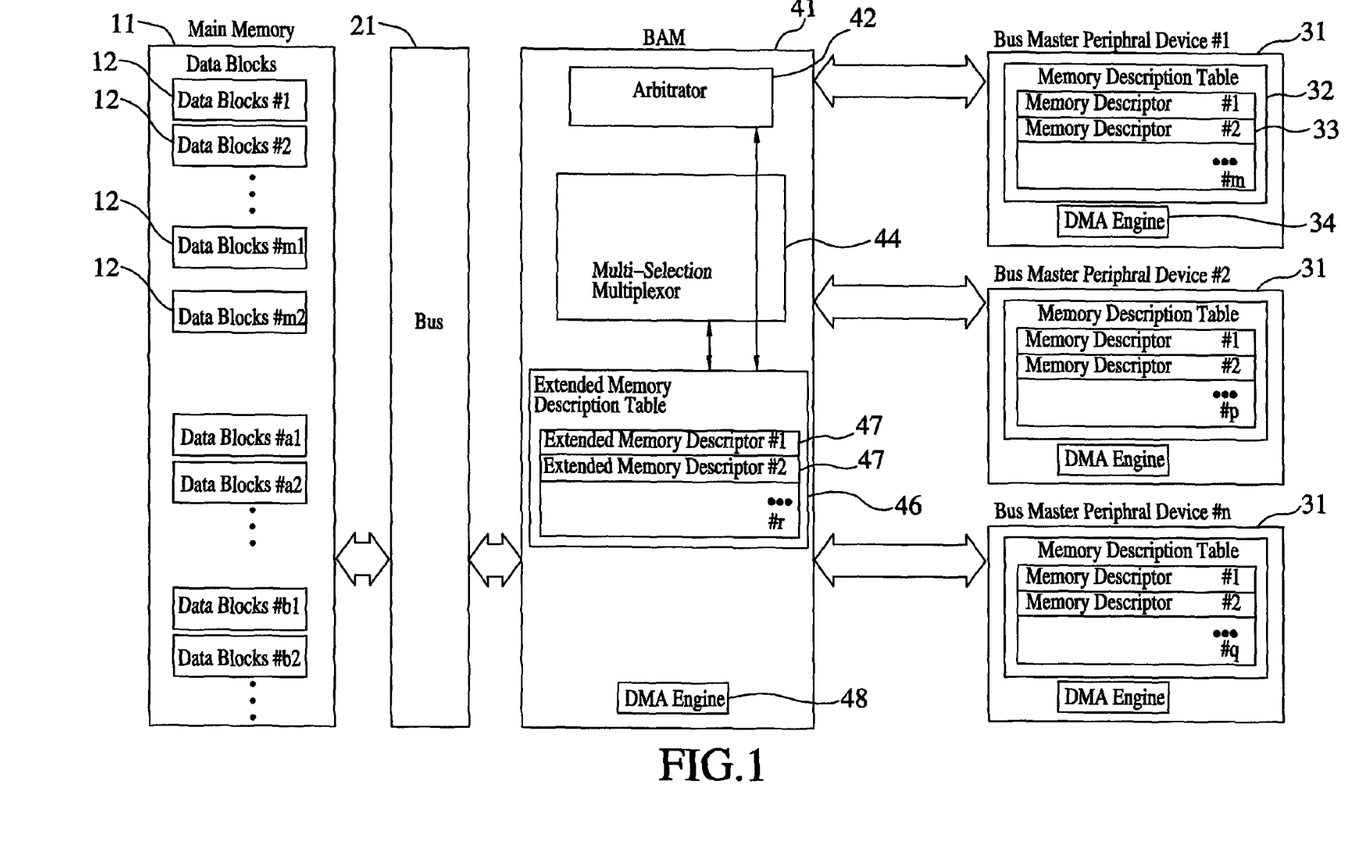
FIG. 1 is a block diagram of a first preferred embodiment of the present invention.

Referring to FIG. 1, a collaborative bus arbitration multiplex architecture 10 in accordance with a first preferred embodiment of the present invention is composed of a main memory 11, a bus 21, a plurality of BMPDs 31, and a BAM 41. The detailed descriptions and operations of these elements as well as their interrelations are recited in the respective paragraphs as follows.

The main memory 11 includes a plurality of data blocks 12.

The bus 21 is electrically connected with the main memory 11.

Each of the BMPDs 31 includes an MDT 32 and a DMA engine 34. The MDT 32 has at least one memory descriptor 33. The at least one memory descriptor 33 is plural in this embodiment as an example.

The BAM 41 is electrically connected with the BMPDs 31 and the bus 21 and includes an arbitrator 42, a multi-selection multiplexor 44, an EMDT 46, and a DMA engine 48. The EMDT 46 has at least one extended memory descriptor 47. The arbitrator 42 has a generic arbitration principle (not shown). In this embodiment, the at least one extended memory descriptor 47 is plural as an example. Each of the extended memory descriptors 47 primarily contains the location and size of the corresponding data block 12, what the BMPDs 31 taking part in the data access are, and the working mode (e.g. read, write, compare, or computation) of the participative BMPDs. The multi-selection multiplexor 44 is provided for connecting the access relationship between the BMPDs 31 and the main memory 11.

Figure 2:
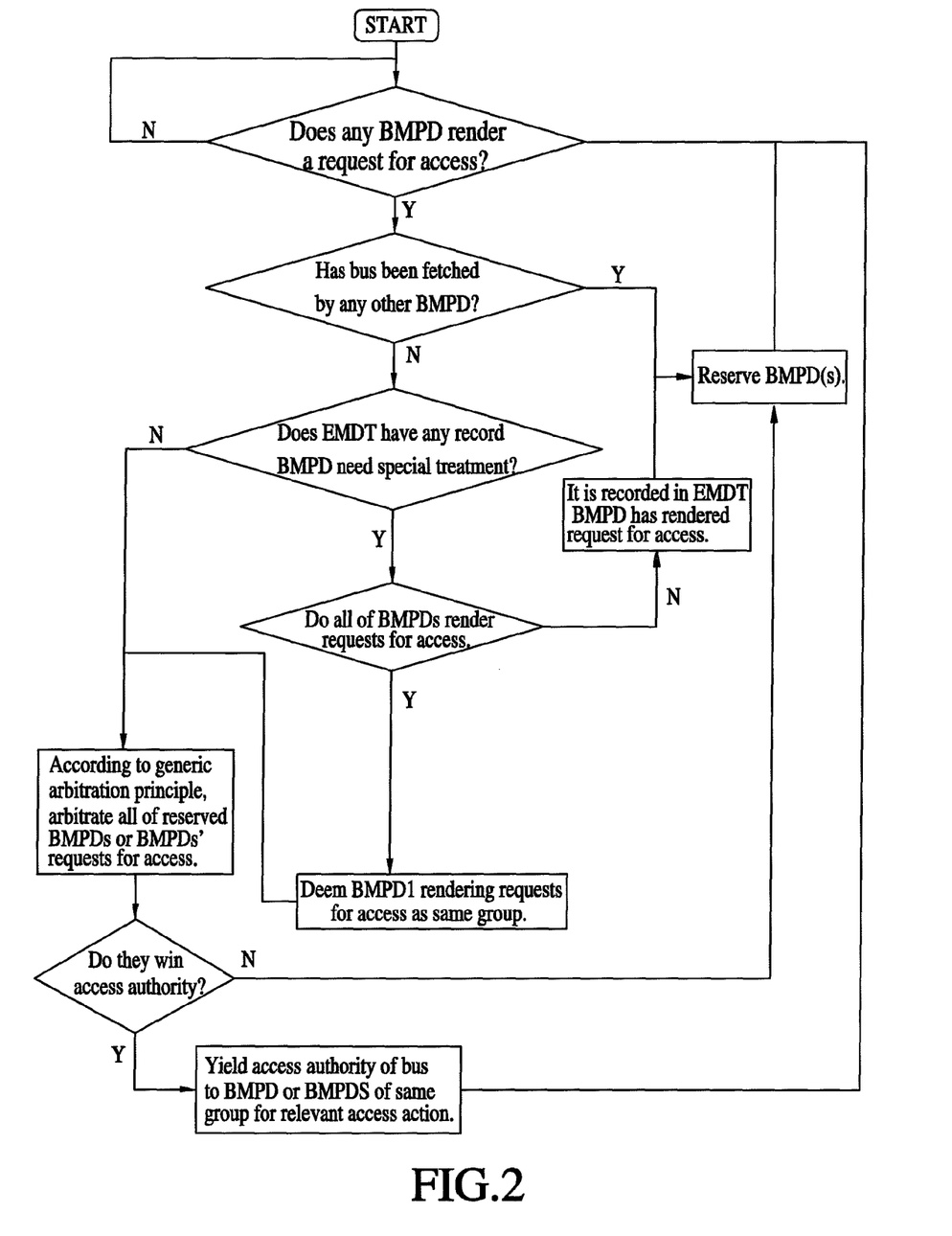
FIG. 2 is a flow chart of the first preferred embodiment of the present invention.

Referring to FIG. 1 again and FIG. 2, a method of arbitration of data access based on the aforesaid the collaborative bus arbitration multiplex architecture includes the following steps.

A) Await whether any of the BMPDs renders a request for access; if yes, proceed to the step B).

B) Identify whether the access authority of the bus 21 is being fetched by any other BMPDs; if yes, reserve the request for access indicated in the step A) and return to the step A); if not, proceed to the step C).

C) Identify whether the data block 12 and the EMDT 46 to which such request for access corresponds have any record that the BMPD rendering such request for access needs special treatment; if yes, proceed to the step D); if not, proceed to the step E).

D) Execute the special treatment by identifying whether every BMPDs 31 recorded in the EMDT 46 has rendered the request for access while multiple BMPDs 31 render the same request for access; if yes, deem the BMPDs 31 rendering such requests for access as the same group and then proceed to the step E); if not, in the EMDT 46 note that the BMPDs 31 have rendered the requests for access and then return to the step B).

E) According to a generic arbitration principle, identify whether the BMPDs 31 in no need of the special treatment indicated in the step C) win the access authority or identify whether the requests for access of the BMPDs 31 in the same group as indicated in the step D) win the access authority; if the answer of either is yes, proceed to the step F); if the answers of both are noes, reserve the request for access of the single BMPD 31 or those of the BMPDs 31 in the same group and return to the step A).

F) Yield the access authority of the bus to the single BMPD 31 or the BMPDs 31 winning the access authority as indicated in the step E).

G) Access the main memory 11. The access to the main memory 11 is done by all of the BMPDs whose requests for access are reserved and which have fetched the access authorities. In this way, the effects resulting from collaborative operation for access can be attained.

In the aforesaid steps, the step B) can proceed after the step D) to become the step of identifying whether any access authority of the bus 21 is being fetched by other BMPDs; if yes, reserve the request for access indicated in the step A) and return to the step A); if not, proceed to the step E).

Next, the operations under the collaborative bus arbitration multiplex architecture are illustrated below.

Because the multi-selection multiplexor 44 can do multiple selections, it may happen that the data in the main memory 11 are transmitted to the multiple BMPDs 31 in the process of read.

Figure 3:
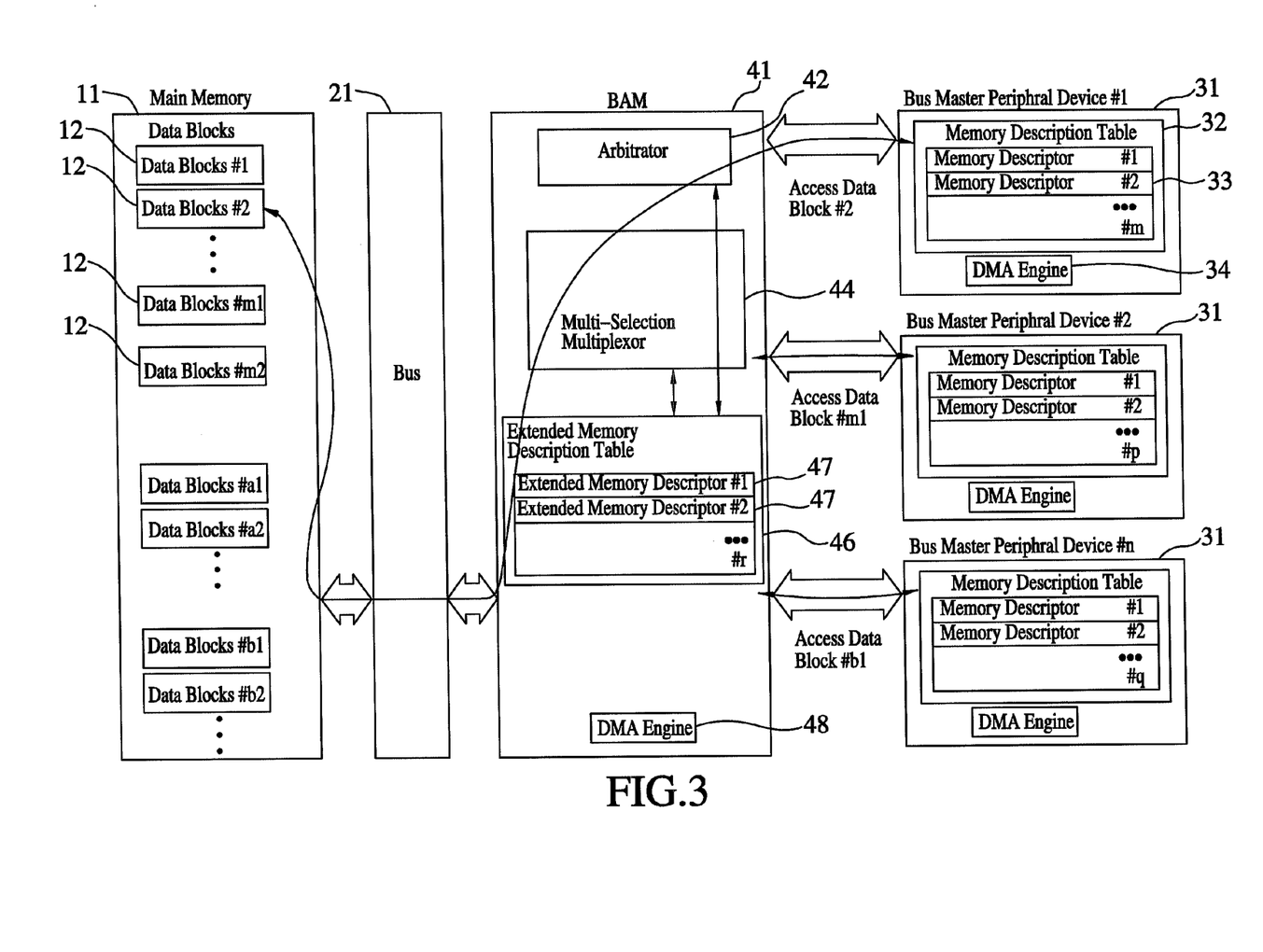
FIG. 3 is a block diagram of the first preferred embodiment of the present invention in operation.

Under the general circumstances, if it is intended to access the data block 12, which is not recorded in the MDT 32, or the BMPD recorded in the EMDT 46 intends to access data, both must comply with the generic arbitration principle. For example, provided the data block 12(#2) that the BMPD 31(#1) in FIG. 3 intends to access is not located in the EMDT 46 of the BAM 41, after the BMPD 31(#1) is qualified to fetch the access authority according to the generic arbitration principle, the BMPD 31(#1) can access the data block 12(#2). However, provided the BAM 41 records that the BMPDs 31 participating in the access are #2 and #n, the access action of the BMPD to the data block 12(#m1) is reserved because the BMPD 31(#1) is accessing and the data block 12 that the participative BMPD 31(#n) requests to access is not #m2 but #b1.

Figure 4:
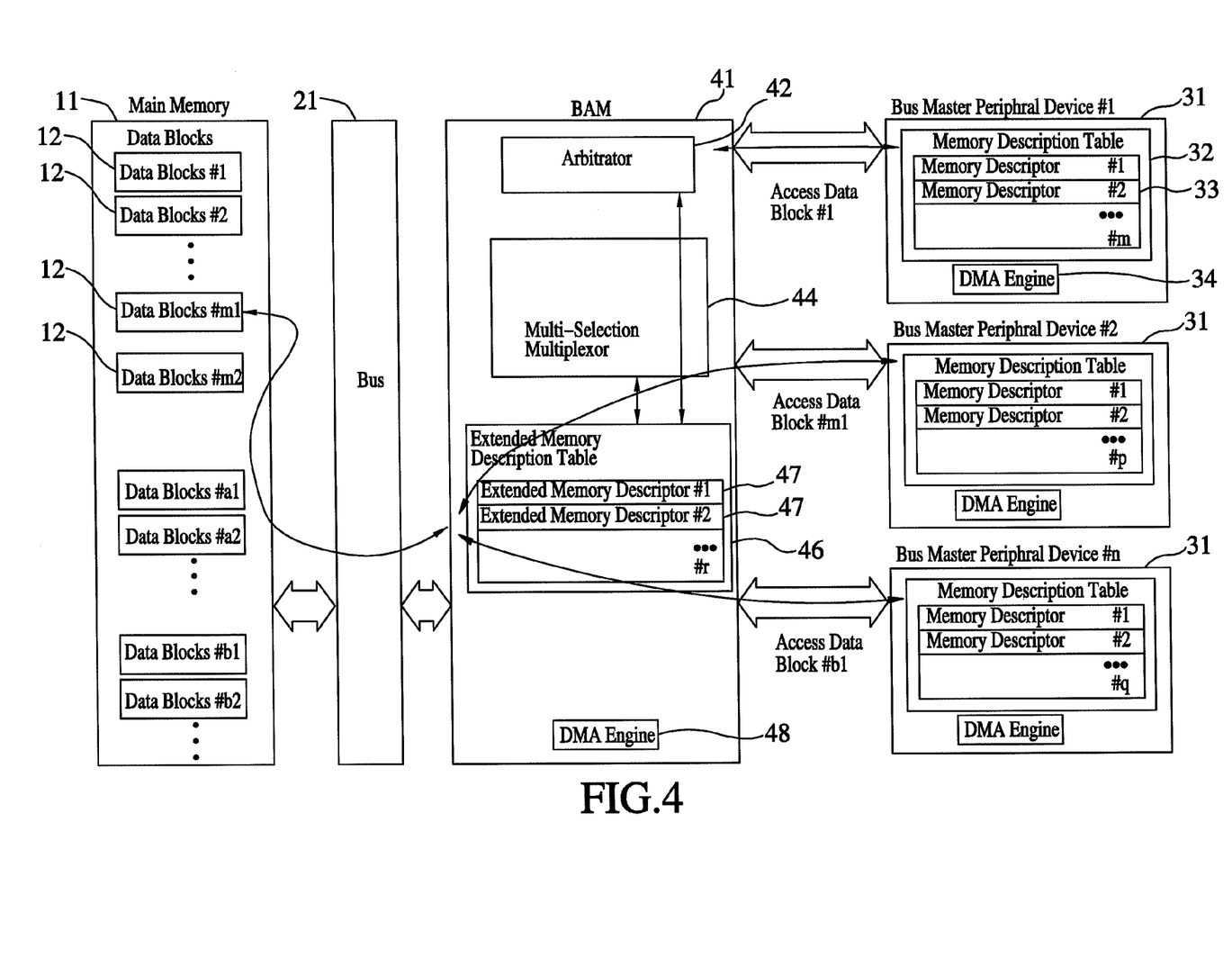
FIG. 4 is another block diagram of the first preferred embodiment of the present invention in operation.

In addition, when the DMA engine 48 of the BAM 41, via the arbitrator 42, finds that the data block 12 which some BMPD 31 intends to access belongs to members of the same group containing the BMPDs 31 recorded in the EMDT 46, the BAM 41 will reserve the access action of the BMPD 31. Until all of the other members of the group of the BMPDs 31 render the same request for access to the data block 12, the multi-selection multiplexor 44 can be activated, which is the so-called special treatment in the aforesaid method. Next, allow all of the participative BMPDs 31 to fetch the access authorities of the same data block 12 corresponding to the main memory 11. Referring to FIG. 4, the EMDT 46 of the BAM 41 records that the data block 12 (#m1) belongs to the members of the same group containing the BMPDs 31(#2 and #n); when all of the participative BMPDs 31(#2 and #n) render the requests for access to the data block 12 (#m1), the condition that all of the members of the same group have participated in the access is satisfied, so the BAM 41 proceeds to arbitrate between the requests of access of the BMPDs 31 satisfying the aforesaid condition and that of the other BMPD 31 not satisfying the condition. In FIG. 4, it is shown that such group fetches the control authority, i.e. the BMPDs 31(#2 and #n) can access the main memory 11, and the request for access of the other BMPD 31(#1) is reserved.

The access action indicated in the previous paragraph can be alternatively done by that the BAM 41 reads the data block 12(#m) once and then transmits the reading to the participative BMPDs 31(#2 and #n). In this way, the frequency of access to the main memory 11 can be decreased to heighten the efficiency of reading the same data block 12 at the same time for the multiple BMPDs 31.

Figure 5:
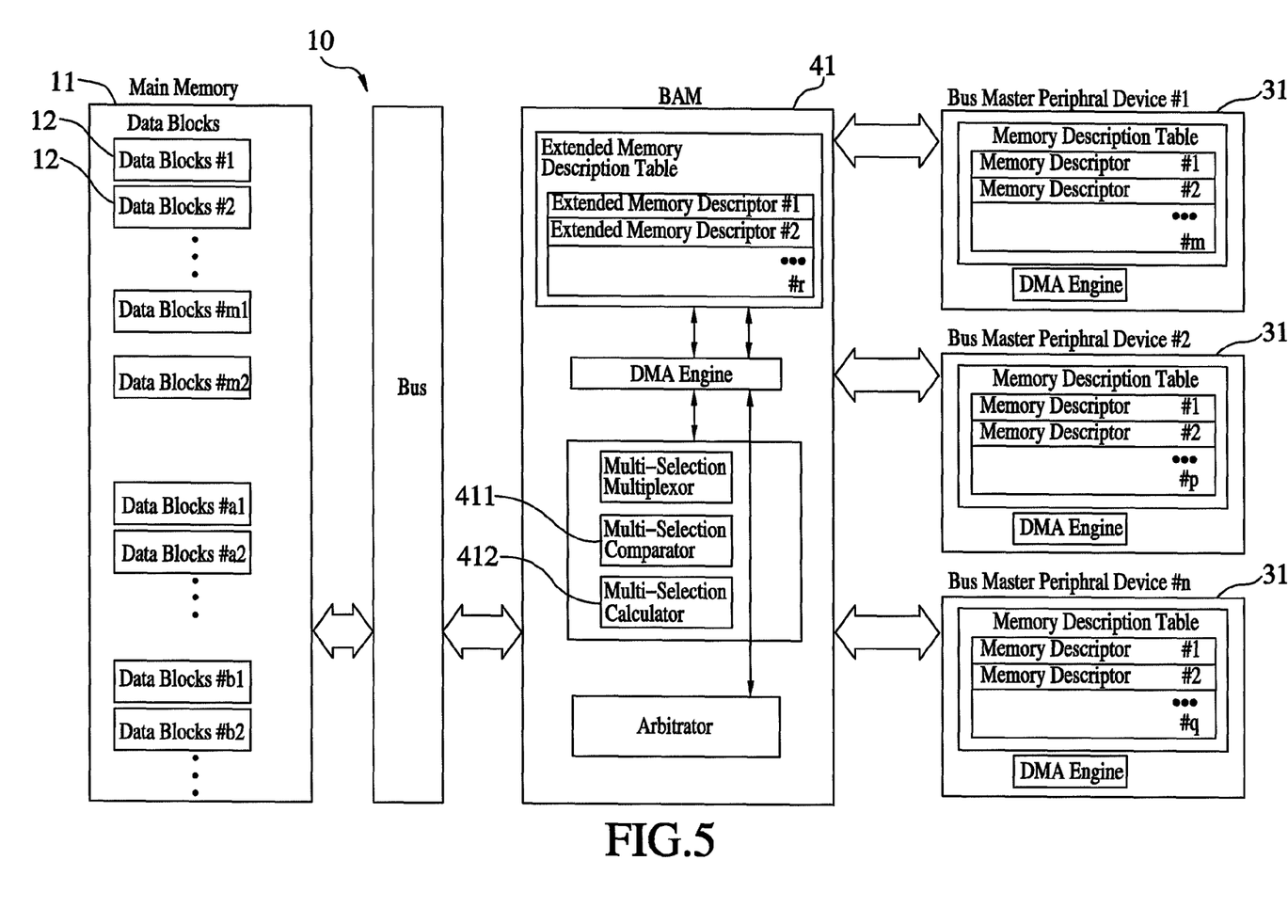
FIG. 5 is another block diagram of the first preferred embodiment of the present invention, in which the multi-selection comparator and the multi-selection calculator are included.

Referring to FIG. 5, the BAM 41 further includes a multi-selection comparator 411. The multi-selection comparator 411 can read some data block 12 (#m1) and compare read data with those of the BMPDs 31(#2 and #n) to check whether the data are consistent with each other or not. Thus, the efficiency of reading the main memory 11 can be accelerated. The comparison can proceed via hardware to further accelerate the operation.

Referring to FIG. 5 again, the BAM 41 further includes a multi-selection calculator 412. The multi-selection calculator 412 can compute the data from the BMPDs 31(#1 and #2), then combine them into a datum, and finally put it into the data block 12(#m) of the main memory 11. The most popular application is to compute parity code and then save the result of the computation. The user can design different calculators as per his or her needs for being put into the BAM 41.

Figure 6:
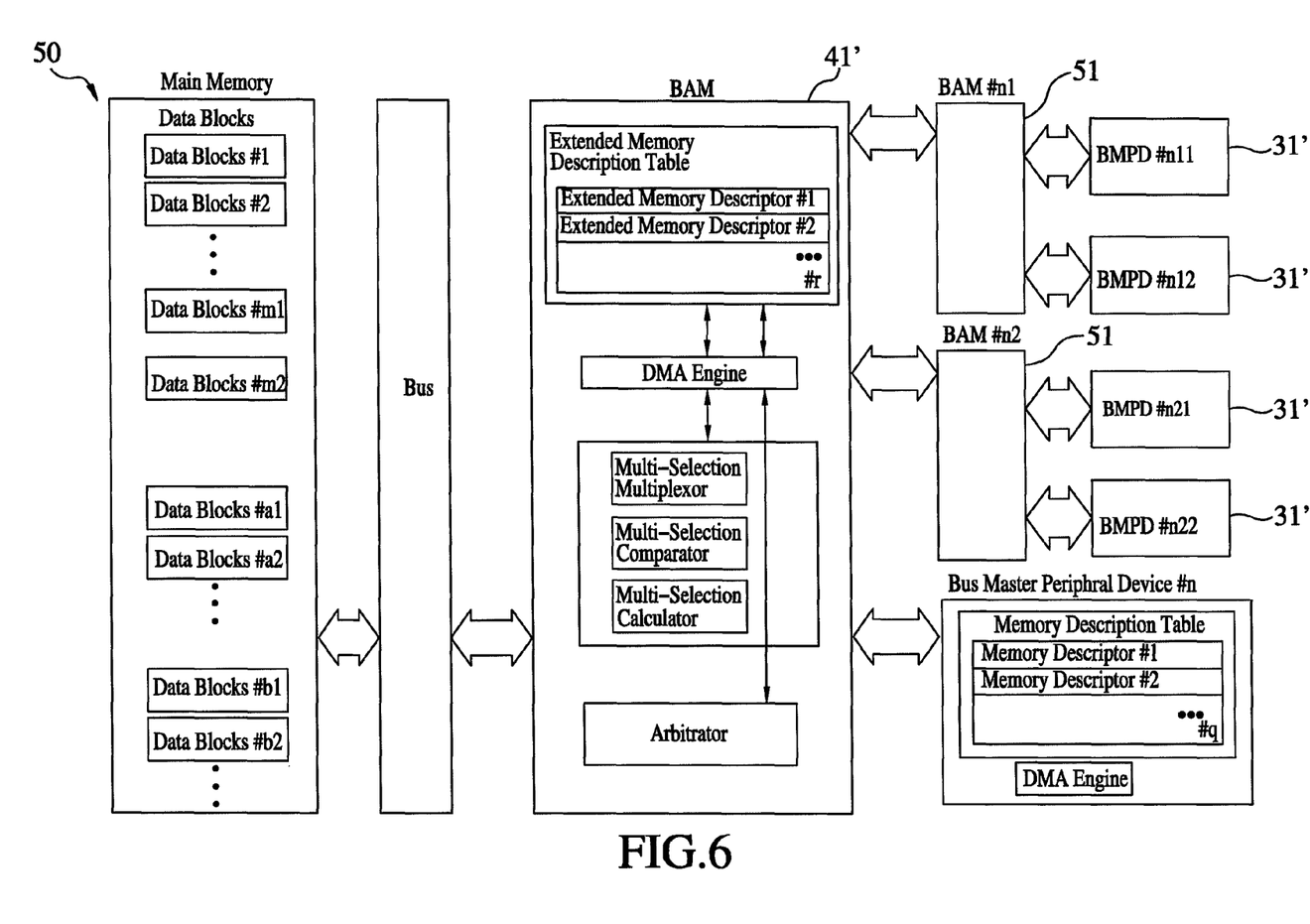
FIG. 6 is a block diagram of a second preferred embodiment of the present invention.

Referring to FIG. 6, a collaborative bus arbitration multiplex architecture 50 in accordance with a second preferred embodiment of the present invention is similar to that of the first embodiment, having the following differences recited below.

A plurality of sub-BAMs 51 are mounted between the BAM 41' and the BMPDs 31' and are electrically connected with the BAM 41' and the BMPDs 31'. Besides, each of the sub-BAMs 51 corresponds either to the plural BMPDs 31' or to at least one BMPD 31'. In this way, a multi-level BAM architecture is constituted to further expand the number of the BMPDs 31' that the BAM can be connected with. However, the delay of the data access is prolonged. The other structural features and the effects that can be reached are identical to those of the first embodiment, so more recitation thereof is skipped.

In conclusion, the present invention can achieve the following effects

1. The BAM 41 can generate an arbitration protocol for managing the sequence of control authority of each BMPD to enable all of the BMPDs accessing the same data block to collaborate for synchronous access in such a way that the need for bandwidth of the whole architecture becomes less.

2. In the process of the arbitration, the comparison and data computation can proceed at the same time to further enhance the reading efficiency or operating rate.

Although the present invention has been described with respect to specific preferred embodiments thereof, it is in no way limited to the specifics of the illustrated structures but changes and modifications may be made within the scope of the appended claims.

What is claimed is:

1. A collaborative bus arbitration multiplex architecture comprising:
   a main memory having a plurality of data blocks;
   a bus electrically connected with the main memory;
   a plurality of bus master peripheral devices (BMPDs), each of which having a memory description table (MDT) and direct memory access (DMA) engine, the memory description table (MDT) having at least one memory descriptor; and
   a bus arbitration & multi-selection multiplexor (BAM) electrically connected with the BMPDs and the bus and having an arbitrator, a multi-selection multiplexor, an extended MDT (EMDT), and a DMA engine, the extended MDT having at least one extended memory descriptor, the arbitrator having a generic arbitration principle.

2. The collaborative bus arbitration multiplex architecture as defined in claim 1, wherein the BAM further comprises a multi-selection comparator.

3. The collaborative bus arbitration multiplex architecture as defined in claim 1, wherein the BAM further comprises a multi-selection calculator.

4. The collaborative bus arbitration multiplex architecture as defined in claim 1 further comprising a plurality of sub-BAMs mounted between the BAM and the BMPDs, wherein the sub-BAMs are electrically connected with the BAM and the BMPDs.

5. The collaborative bus arbitration multiplex architecture as defined in claim 4, wherein each of the sub-BAMs corresponds to at least one of the BMPDs.

6. A method of arbitration of data access based on the collaborative bus arbitration multiplex architecture defined in claim 1 comprises steps of:
   A) awaiting whether any of the BMPDs renders a request for access; if yes, proceed to the step B);
   B) identifying whether an access authority of the bus is being fetched by any other BMPDs; if yes, reserve the request for access indicated in the step A) and return to the step A); if not, proceed to the step C);
   C) identifying whether the data block and the EMDT to which the request for access corresponds have any record that the BMPD rendering the request for access needs special treatment; if yes, proceed to the step D); if not, proceed to the step E);
   D) executing the special treatment by identifying whether all of the BMPDs rendering the same requests for access as recorded in the EMDT have rendered the requests for access; if yes, deem the BMPDs rendering such requests for access as the same group and then proceed to the step E); if not, in the EMDT note that the BMPDs have rendered the requests for access and then return to the step B);
   E) according to a generic arbitration principle, identifying whether a single BMPD in need of no special treatment as indicated in the step C) wins the access authority or identifying whether the requests for access of the BMPDs in the same group as indicated in the step D) win the access authority; if the answer of either is yes, proceed to the step F); if the answers of both are noes, reserve the request for access of the single BMPD or those of the BMPDs in the same group and return to the step A);
   F) yielding the access authority of the bus to the single BMPD or the BMPDs of the same group winning the access authority as indicated in the step E); and
   G) accessing the main memory.

7. The method as defined in claim 6, wherein the step B) can proceed after the step D) to become the step of identifying whether any access authority of the bus is being fetched by other BMPDs; if yes, reserve the request for access indicated in the step A) and return to the step A); if not, proceed to the step E).

* * * * *